United States Patent
Daniels

(10) Patent No.: US 7,118,178 B2
(45) Date of Patent: Oct. 10, 2006

(54) POWER FOLDING SEAT

(75) Inventor: Andrew R. Daniels, Newmarket (CA)

(73) Assignee: Intier Automotive Inc,, Newmarket (CA)

(*) Notice: Subject to any disclaimer, the term of this patent is extended or adjusted under 35 U.S.C. 154(b) by 145 days.

(21) Appl. No.: 10/493,186

(22) PCT Filed: Nov. 6, 2002

(86) PCT No.: PCT/US02/35744

§ 371 (c)(1),
(2), (4) Date: Apr. 20, 2004

(87) PCT Pub. No.: WO03/039905

PCT Pub. Date: May 15, 2003

(65) Prior Publication Data

US 2004/0195892 A1 Oct. 7, 2004

(51) Int. Cl.
B60N 2/02 (2006.01)
B60N 2/20 (2006.01)
B60N 2/30 (2006.01)
B60N 2/36 (2006.01)

(52) U.S. Cl. .............. 297/378.1; 297/362.11; 296/65.17

(58) Field of Classification Search .......... 297/378.12, 297/378.13, 378.14, 362.11, 378.1; 296/65.17
See application file for complete search history.

(56) References Cited

U.S. PATENT DOCUMENTS

| 2,660,223 A | 11/1953 | Appleton |
| 2,942,646 A | 6/1960 | Himka et al. |
| 4,602,256 A | 7/1986 | Akita et al. |
| 4,832,403 A | 5/1989 | Tomita |
| 5,269,588 A | 12/1993 | Kunz et al. |
| 5,393,123 A | 2/1995 | Hernandez et al. |
| 5,435,624 A | 7/1995 | Bray et al. |
| 5,707,112 A | 1/1998 | Zinn |
| 5,884,970 A * | 3/1999 | Howard ................. 297/362.14 |
| 5,918,939 A * | 7/1999 | Magadanz ............. 297/378.12 |
| 6,017,090 A * | 1/2000 | Bonk .................... 297/362.12 |
| 6,078,252 A | 6/2000 | Kulczycki et al. |
| 6,079,763 A | 6/2000 | Clemente |
| 6,095,609 A * | 8/2000 | Magadanz ............. 297/378.12 |
| 6,199,953 B1 * | 3/2001 | Chen ......................... 297/367 |
| 6,270,141 B1 | 8/2001 | Moon et al. |

* cited by examiner

Primary Examiner—Anthony D. Barfield
(74) Attorney, Agent, or Firm—Clark Hill PLC

(57) ABSTRACT

A power folding seat for installation within a vehicle includes a seat cushion mountable to the vehicle, a seat back pivotally coupled to the seat cushion, and a power actuator disposed within the seat back for automatically rotating the seat back between an upright position and a folded position. The power actuator includes a power seat recliner, a latch assembly, a power head restraint adjuster, and a control system coupled to the power seat recliner, the latch assembly, and the power head restraint adjuster. The control system includes a signal receiver which is configured to receive commands from a remote transmitter, and a data processor coupled to the signal receiver. The data processor controls the power seat recliner, the power latch actuator and the power head restraint adjuster, and is configured to move the seat back between the upright position and the folded position in accordance with the received remote commands.

9 Claims, 3 Drawing Sheets

POWER FOLDING SEAT

BACKGROUND OF THE INVENTION

1. Technical Field

The present invention relates to a folding seat for automobiles. In particular, the present invention relates to an automobile seat whose seat back automatically rotates between an upright and a folded position under electrical power.

2. Description of the Related Art

Conventional rear seats for an automotive vehicle include a seat cushion and a seat back disposed adjacent the rear cargo area of the automobile. The seat back is pivotally coupled to the seat cushion to allow the seat back to be rotated from an upright position to a folded position, and thereby extend the effective volume of the rear cargo area. The seat back also includes a latch which secures the seat back in the upright position.

Although rear folding seats are widely used for facilitating rear passenger occupancy and for extending the effective cargo area of an automobile, the conventional automobile seat is difficult to operate. For instance, if the automobile owner has returned from a shopping trip carrying several packages for storage in the rear cargo area of the automobile, the owner must first drop the packages, and then open either the rear passenger doors or the rear cargo door of the automobile in order to manually release the seat latch. If the automobile is a sport coupe having only two doors, the automobile owner must slide the front passenger seats forward to gain assess to the rear folding seat, and then climb into the rear seat in order to release the rear seat latch. The automobile owner must then manually rotate the seat back into the folded position, and then return to the rear portion of the automobile in order to store the packages in the rear cargo area.

Therefore, there remains a need for an automobile seat which allows the effective rear cargo area of an automobile to be automatically accessible as needed.

SUMMARY OF THE INVENTION

According to the present invention there is provided a power folding seat for installation within a vehicle. The seat includes a seat cushion mountable to the vehicle, a seat back pivotally coupled to the seat cushion, and a power actuator disposed within the seat back for automatically rotating the seat back between an upright position and a folded position.

In accordance with a preferred embodiment of the invention, the seat back also includes an adjustable head restraint. The power actuator includes a power seat recliner, a latch assembly, a power head restraint adjuster, and a control system coupled to the power seat recliner, the latch assembly, and the power head restraint adjuster.

The power seat recliner comprises a prime mover and a gear train coupled between the prime mover and a fixed pivot pin on the vehicle for rotating the seat back between the upright position and the folded position. The latch assembly comprises a mechanical seat latch for securing the seat back in the upright position and a power latch actuator coupled to the mechanical seat latch and configured to manipulate the mechanical seat latch between a cinched or latched position and a released position. The power head restraint adjuster comprises a prime mover and a gear coupled between the prime mover and the head restraint for moving the head restraint vertically between an extended position and a retracted position.

The control system includes a signal receiver which is configured to receive commands from a remote transmitter, and a data processor coupled to the signal receiver. Typically, the remote transmitter comprises a key fob fitted with a wireless transmitter. The data processor controls the power seat recliner, the power latch actuator and the power head restraint adjuster (if provided), and is configured to move the seat back between the upright position and the folded position in accordance with the received remote commands.

According to the present invention there is also provided a method for automatically rotating a seat back of an automobile seat between an upright position and a folded position. The seat back is pivotally coupled to the automobile, and includes a power seat recliner for rotating the seat back between the upright position and the folded position, a mechanical seat latch for securing the seat back in the upright position, a power latch actuator configured to manipulate the mechanical seat latch between a cinched or latched position and a released position, and a control system coupled to the power seat recliner and the power latch actuator. The method includes the steps of (1) receiving a remote user command requesting operation of the seat back; and (2) actuating the power seat recliner and the power latch actuator to rotate the seat back under vehicle power in accordance with the received remote user command.

Typically, the remote user commands comprises either an electronic fold command signal commanding deployment of the seat back into the folded position, or an electronic upright command signal commanding deployment of the seat back into the upright position. In the case where the command signal comprises the fold command signal, the actuating step comprises the steps of commanding the power latch actuator to release the mechanical seat latch, and commanding the power seat recliner to rotate the seat back portion into the folded position. In the case where the command signal comprises the upright command signal, the actuating step comprises the steps of commanding the power seat recliner to rotate the seat back into the upright position and commanding the power latch actuator to cinch the mechanical seat latch.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
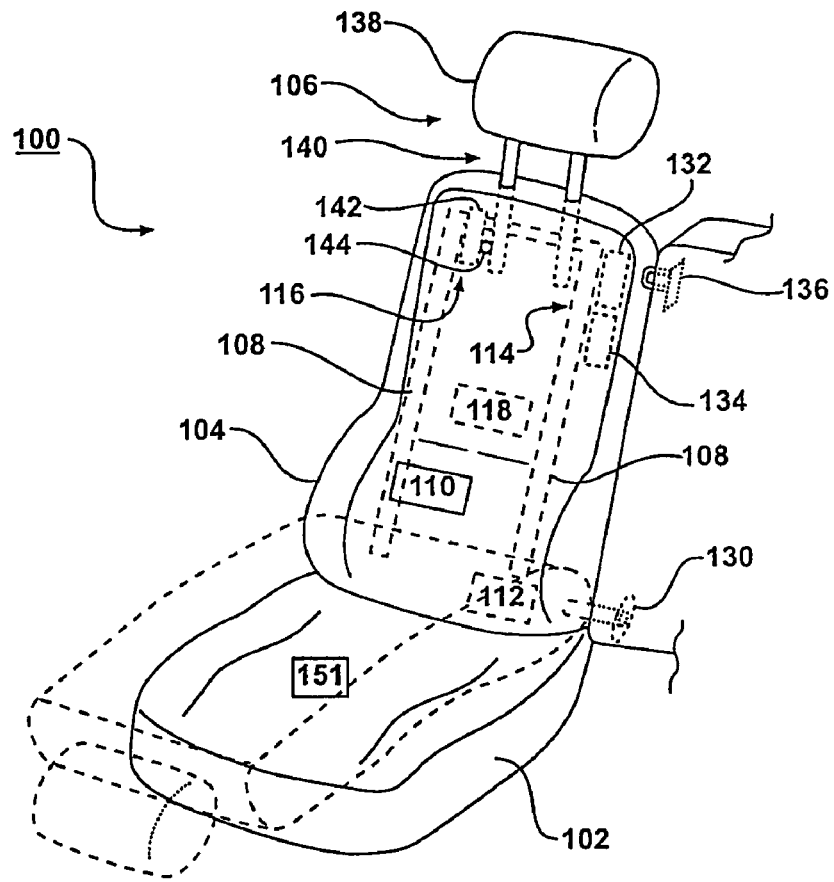
FIG. 1 is a schematic view of a power folding seat according to the present invention disposed within an automobile, depicting the seat cushion, the seat back portion, and the power actuator, including the power seat recliner, the latch assembly, and the power head restraint adjuster.

Referring to FIG. 1, a power folding seat according to the present invention is shown at 100 disposed within an automobile. The power folding seat 100 comprises a seat cushion 102 and a seat back 104. The seat back 104 has a base which is disposed above the seat cushion 102 and is pivotally coupled at its base to the seat cushion 102 to allow the seat back portion 104 to rotate about its base between an upright position and a folded position overlying the seat cushion 102 as shown in phantom. The seat back 104 preferably also includes an adjustable head restraint 106 which is vertically movable between an extended position and a retracted position.

Consistent with conventional seat back, the seat back 104 comprises a frame structure 108 (see FIG. 3), foam padding, and a fabric cover enclosing the frame 108 and the foam padding. In contrast to conventional seat back portions, the seat back portion 104 also includes a power actuator 110 disposed between frame members 108.

As will be discussed below, the power actuator 110 is configured to rotate the seat back 104 between the upright position and the folded position. However, as the power actuator 110 is disposed within the seat back 104, the power folding seat 100 can be easily installed into an automobile without occupying space assigned to other automobile components.

Although illustrated as a single seat, it is apparent to those in the art that a bench style seat with a single or multiple seat back (commonly 60/40 seat backs) may also incorporate the present invention.

Figure 2:
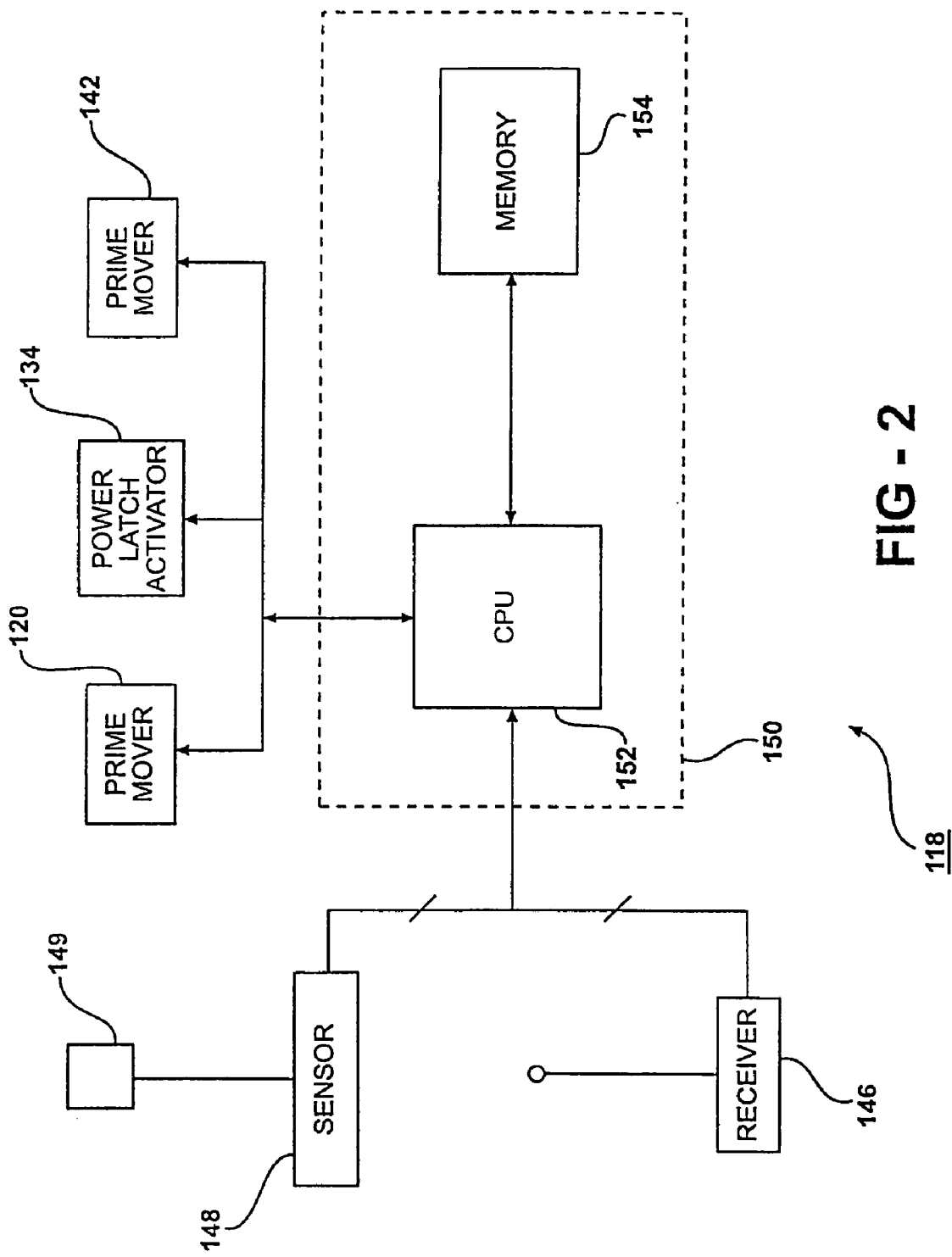
FIG. 2 is a schematic diagram of the power seat recliner, the latch assembly, the power head restraint adjuster and the signal receiver of the control system of the power actuator.

As shown in FIGS. 1 and 2, the power actuator 110 includes a power seat recliner 112, a latch assembly 114, a power head restraint adjuster 116, and a control system 118 operatively coupled to the power seat recliner 112, the latch assembly 114 and the power head restraint adjuster 116.

Figure 3:
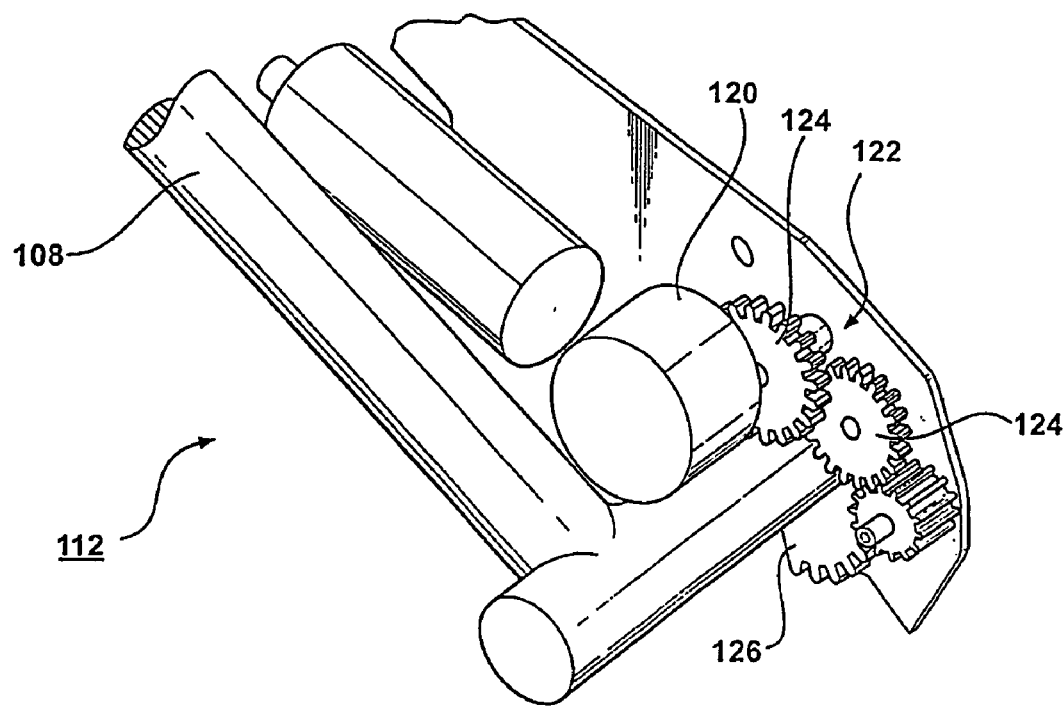
FIG. 3 is a perspective view of the power seat recliner, depicting the electric motor and the gear train.

As shown in FIG. 3, the power seat recliner 112 is disposed adjacent the base of the seat back 104, and includes a prime mover 120 and a gear train 122. The prime mover 120 is secured to one of the frame members 108 of the seat back 104. Further, preferably the prime mover 120 comprises a DC electric motor powered by the electrical system of the automobile, however other forms of prime movers, such as hydraulically-actuated systems, may also be employed.

Figure 5:
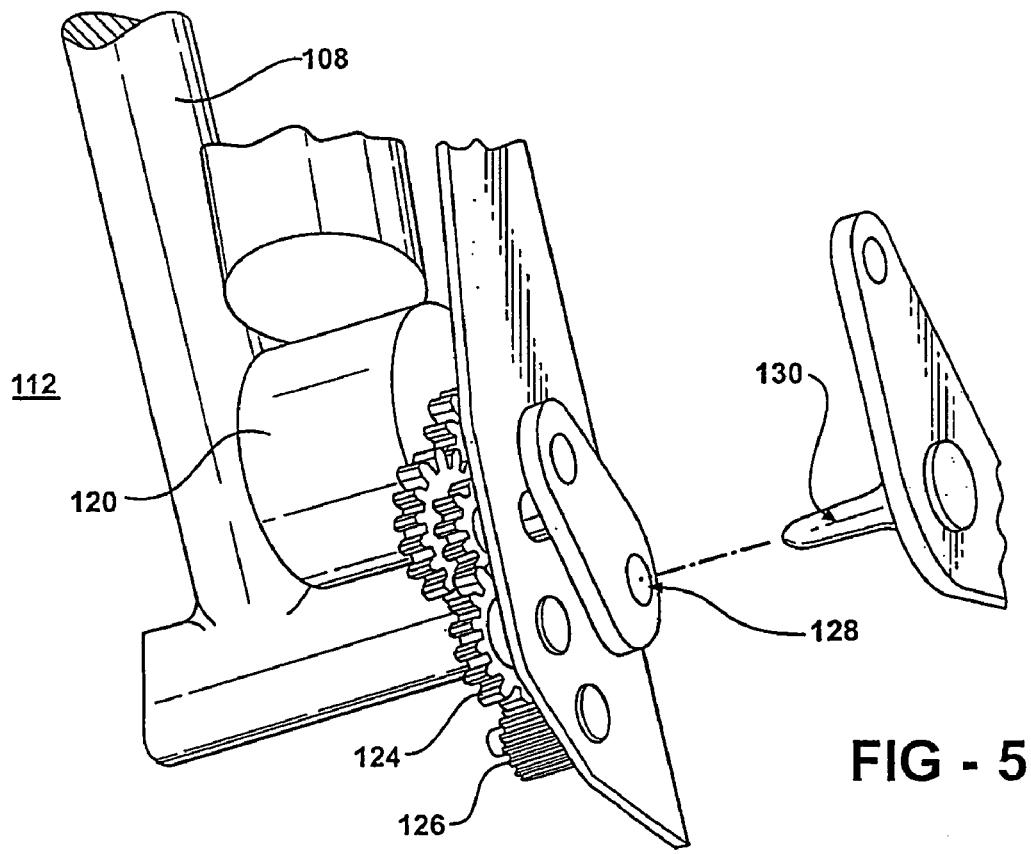
FIG. 5 is another perspective view of the power seat recliner, depicting the final gear element shown in FIG. 4 and the keyed pin.
Figure 4:
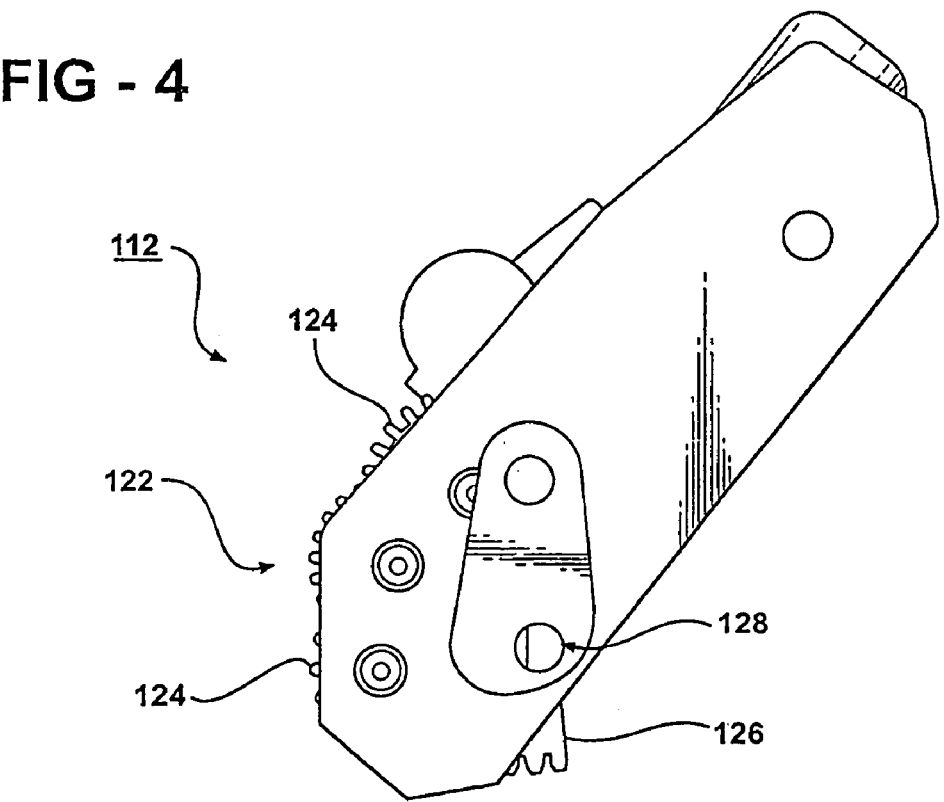
FIG. 4 is side plan view of the power seat recliner depicting the final gear element of the gear train shown in FIG. 3.

The gear train 122 is mechanically coupled between the prime mover 120 and a fixed pivot point secured to the automobile body. As shown in FIGS. 3 and 4, the gear train 122 includes a number of intermediate gears 124 each having gear teeth engaging the gear teeth of at least one other intermediate gear 124 of the gear train 122. The gear train 122 also includes a final sector gear 126 having gear teeth which engages the gear teeth of one of the intermediate gears 124. The final gear 126 includes a keyed aperture 128, proximate to the base of the seat back 104, which is configured to receive a similarly-keyed pivot pin therein 130. The pivot pin 130 is fixed to the automobile body and engages the keyed aperture 128. As shown in FIGS. 4 and 5, the keyed aperture 128 has a substantially square transverse cross-section and, of course, the pivot pin 130 has a corresponding shape. However, it will be apparent that other shapes for the keyed aperture 128 and the pivot pin 130 may be used.

Since the pivot pin 130 is secured to the automobile body, the pivot pin 130 prevents, the final gear 126 from rotating relative to the automobile. Consequently, when the prime mover 120 is active and is driving the gear train 122, the seat back 104 is forced to pivot about its base and about the pivot pin 130. As will be apparent, the seat back 104 will rotate into the upright position when the prime mover 120 is commanded to rotate in one direction, and will rotate into the folded position when the prime mover 120 is commanded to rotate in the opposite direction. This allows any forces exerted on the seat back 104 to be transferred through the gear train 122 to the pivot pin 130 and structural body of the vehicle thereby reducing structure and weight in the seat 100.

The latch assembly 114 of the power actuator 110 is shown in FIGS. 1 and 2. As shown, the latch assembly 114 includes a mechanical seat latch 132, a power latch actuator 134 mechanically coupled to the mechanical seat latch 132, and a latching post or striker 136 secured to the automobile. The mechanical seat latch 132 and the power latch actuator 134 are both disposed within the seat back 104 adjacent the upper end of the seat back 104. The mechanical seat latch 132 is of the type commonly found in automobiles and preferably comprises a spring-actuated latch mechanism and a release pawl. The mechanical seat latch 132 is configured to cinch the striker 136 when the striker 136 engages the mechanical seat latch 132, and to release the striker 136 upon command from the power latch actuator 134.

The power latch actuator 134 is mechanically coupled to the release pawl of the mechanical seat latch 132. Preferably, the power latch actuator 134 is powered by the electrical system of the automobile, and comprises a standard DC actuator, however in one variation the power latch actuator 134 comprises a cinching actuator. Further, it should be understood that although the power latch actuator 134 is preferably electrically powered, other power sources may also be employed.

As discussed above, the power latch actuator 134 is coupled to the release pawl of the mechanical seat latch 132. Consequently, when the power latch actuator 134 is activated, the release pawl is rotated away from the spring-actuated latch mechanism, thereby causing the mechanical seat latch 132 to release the latching post 136 and to allow the seat back 104 to be rotated from the upright position to the folded position via the power seat recliner 112, as described above. However, when the power latch actuator 134 is deactivated, the release pawl is allowed to rotate into engagement with the spring-actuated latch mechanism. Consequently, when the power latch actuator 134 is deactivated and the power seat recliner 112 is commanded to rotate the seat back 104 into the upright position, the mechanical seat latch 132 cinches the latching post 136 when the seat back 104 reaches the upright position, thereby securing the seat back 104 in the upright position to the automobile.

As discussed above, preferably the seat back 104 includes a head restraint 106. The head restraint 106 is vertically movable between an extended position and a retracted position, and includes a head cushion 138 and a vertically-extending rack gear 140. The rack gear 140 is connected to the head cushion 138, and is disposed within the seat back 104 adjacent the upper end of the seat back 104. The power head restraint adjuster 116 of the power actuator 110 is also disposed within the seat back 104 adjacent the upper end of the seat back 104, and is mechanically coupled to the rack gear 140.

The power head restraint adjuster 116 comprises a prime mover 142 and a pinion 144. Preferably, the prime mover 142 comprises a DC electric motor powered by the electrical system of the automobile, however other forms of prime movers may also be employed. The pinion 144 is mechanically coupled between the prime mover 142 and the rack gear 140 of the head restraint 106 for moving the head cushion 138 vertically between the extended position and the retracted position as the prime mover 142 rotates.

The control system 118 of the power actuator 110 is shown in FIG. 2 and includes a signal receiver 146, a position sensor 148, a non-contact sensor 149 and a data processor 150 in communication with the prime mover 120 of the power seat recliner 112, the power latch actuator 134 of the latch assembly 114, the prime mover 142 of the power head restraint adjuster 116, the signal receiver 146, and the position sensor 148. The data processor 150 comprises an electronic memory 152 and a central processing unit 154 electrically coupled to the electronic memory 152.

Preferably, the operator of the automobile is provided with a wireless-enabled key fob, and the signal receiver 146 comprises a wireless signal receiver which is configured to receive user command signals from the wireless-enabled key fob. However, preferably the automobile is fitted with electronic switches, and the signal receiver 146 also comprises a wired signal receiver which is configured to receive user command signals from the automobile switches. Typically, the remote user commands comprises either a "fold command" signal which commands deployment of the seat back 104 into the folded position, or an "upright command" signal commanding deployment of the seat back 104 into the upright position.

Preferably, the control system 118 actuates the prime mover 120 of the power seat recliner 112 by transmitting electronic pulses to the prime mover 120, and the position sensor 148 comprises an electronic counter coupled to the prime mover 120 which counts the transmitted timing pulses. In this manner, the position sensor 148 is able to provide the data processor 150 with information identifying the angular position of the seat back 104. Alternately, in one variation, a pressure sensor 151 is located within the seat cushion 102 which signals the data processor 152 when the seat is occupied, responsively sending a signal to the CPU 154 to prevent the seat from being driven. Other forms of position sensors, such as capacitive sensors and electrical load sensors, may also be employed.

The non-contact sensor 149 is mounted within the seat back 104. Sensor 149 is preferably a capacitive sensor capable of detecting an obstacle in a non-contacting manner. If an obstacle is in the path of travel of the seat back 104, a signal is generated and sent to the CPU 154 to discontinue movement thereof.

The electronic memory 152 includes processing instructions for the data processor 150, which causes the data processor 150 of the power actuator 110 to operate in the following manner. Upon receipt at the signal receiver 146 of a "fold command" signal, the data processor 150 actuates the power latch actuator 134, thereby commanding the mechanical seat latch 132 to release the latching post 136. The data processor 150 then provides the power seat recliner 112 with an appropriate directional signal, thereby causing the power seat recliner 112 to rotate the seat back portion 104 from the upright position into the folded position. The data processor 150 also deactivates the power latch actuator 134, and provides the power head restraint adjuster 116 with an appropriate directional signal, causing the head cushion 138 to move vertically from the extended position to the retracted position.

When the position sensor 148 signals the data processor 150 that the seat back 104 has reached the fully declined position, the data processor 150 removes the directional signal from the power seat recliner 112, thereby terminating further movement of the seat back portion 104.

On the other hand, upon receipt at the signal receiver 146 of an "upright command" signal, the data processor 150 provides the power seat recliner 112 with an appropriate directional signal, thereby causing the power seat recliner 112 to rotate the seat back 104 from the folded position into the upright position. The data processor 150 also provides the power head restraint adjuster 116 with an appropriate directional signal, causing the head cushion 138 to move vertically from the retracted position to the extended position.

When the position sensor 148 signals the data processor 150 that the seat back portion 104 has reached the fully upright position, the data processor 150 removes the directional signal from the power seat recliner 112 thereby terminating further movement of the seat back 104. At this point, the mechanical seat latch 132 cinches the latching post 136, thereby securing the seat back 104 in the unright position to the automobile.

The invention has been described in an illustrative manner, and it is to be understood that the terminology which has been used is intended to be in the nature of words of description rather than limitations. Many modifications and variations of the present invention are possible in light of the above teachings. It is, therefore, to be understood that within the scope of the appended claims, the invention may be practiced other than as specifically described.

What is claimed:

1. A power folding seat for use in an automotive vehicle, said seat comprising:
   a seat cushion mountable to the vehicle;
   a seat back pivotally coupled to the seat cushion; and
   a power actuator disposed within the seat back for automatically rotating the seat back between an upright position and a folded position overlying said seat cushion, said power actuator including a prime mover supported by said seat back for powering said seat back between said upright and folded positions, a fixed gear retained by the vehicle in fixed relation to said seat back, and a gear train coupled between said prime mover and said fixed gear for rotating said seat back between said upright and folded position in response to power actuation of said prime mover.

2. The power folding seat according to claim 1, wherein said power actuator includes a power seat recliner for rotating said seat back between said upright and folded positions, a latch assembly for selectively locking said seat back in said upright position, and a control system coupled to said power seat recliner and the latch assembly for selectively and automatically unlocking said latch assembly and seat back from said upright position and rotating said seat back between said upright and folded positions in response to a command signal received from a remote transmitter.

3. The power folding seat according to claim 2, further including a frame structure for supporting said power actuator in said seat back and a fixed pivot pin on the vehicle for retaining said fixed gear and forcing rotation of said seat back between said upright position and said folded position in response to power actuation of said prime mover.

4. The power folding seat according to claim 3, wherein the fixed pivot pin comprises a keyed pin, and said gear train is configured to engage with said keyed pin to facilitate rotation of said seat back about said keyed pin.

5. The power folding seat according to claim 4, wherein said latch assembly comprises a mechanical seat latch for securing said seat back in said upright position to the vehicle, and a power latch actuator coupled to said mechanical seat latch and configured to manipulate the mechanical seat latch between a cinched position and a released position.

6. The power folding seat according to claim 5, wherein said seat back includes an adjustable head restraint, and said power actuator also includes a power head restraint adjuster, and said control system is coupled to said power head restraint adjuster.

7. The power folding seat according to claim 6, wherein said power head restraint adjuster comprises a prime mover and a gear coupled between said prime mover and said head restraint for moving said head restraint vertically between an extended position and a retracted position.

8. The power folding seat according to claim 2, wherein said control system includes a signal receiver configured to receive commands from said remote transmitter, and a data processor coupled to said signal receiver and configured to operate said power seat recliner and said power latch actuator in response to said received commands.

9. The power folding seat according to claim 8, wherein said signal receiver comprises a wireless signal receiver.

* * * * *